(12) United States Patent
Huang et al.

(10) Patent No.: US 11,375,832 B2
(45) Date of Patent: Jul. 5, 2022

(54) LEARNING TABLEWARE SET

(71) Applicant: CHANG YANG MATERIAL CORP., Changhua County (TW)

(72) Inventors: Ming-Hua Huang, Changhua County (TW); Lung-Hsun Song, Changhua County (TW); Cheng-Hsin Chen, Changhua County (TW); Lin-Chun Sun, Changhua County (TW); Jian-Syun Lu, Changhua County (TW)

(73) Assignee: CHANG YANG MATERIAL CORP., Changhua County (TW)

( * ) Notice: Subject to any disclaimer, the term of this patent is extended or adjusted under 35 U.S.C. 154(b) by 0 days.

(21) Appl. No.: 17/004,014

(22) Filed: Aug. 27, 2020

(65) Prior Publication Data
US 2021/0386224 A1    Dec. 16, 2021

(30) Foreign Application Priority Data

Jun. 12, 2020   (TW) ................................ 109207445

(51) Int. Cl.
| | | |
|---|---|---|
| *A47G 19/06* | (2006.01) | |
| *A47G 19/10* | (2006.01) | |
| *A47G 21/04* | (2006.01) | |

(52) U.S. Cl.
CPC ............. *A47G 19/06* (2013.01); *A47G 19/10* (2013.01); *A47G 21/04* (2013.01)

(58) Field of Classification Search
CPC ........ A47G 19/06; A47G 19/10; A47G 21/04; A47G 19/2261; A47G 23/03; A47G 23/0316; A47G 19/08; A47J 43/287

USPC .............................................. 220/574, 574.1
See application file for complete search history.

(56) References Cited

U.S. PATENT DOCUMENTS

| | | | | |
|---|---|---|---|---|
| 1,220,495 | A * | 3/1917 | Cadby ..................... | A47G 19/02 220/574 |
| 2,757,525 | A * | 8/1956 | Marsala .................. | A47G 19/02 220/574 |
| 3,100,054 | A * | 8/1963 | Rubens ................... | A47G 19/02 220/574 |
| 4,300,700 | A * | 11/1981 | Chang ................ | B65D 43/0204 220/212 |
| 2009/0108004 | A1* | 4/2009 | Bollengier ......... | B65D 43/0202 220/574 |
| 2009/0193661 | A1* | 8/2009 | Wan .................... | A47J 43/0727 30/142 |
| 2011/0174677 | A1* | 7/2011 | Blondeel ................ | A47G 23/06 206/557 |

(Continued)

*Primary Examiner* — Andrew D Perreault
(74) *Attorney, Agent, or Firm* — CKC & Partners Co., LLC

(57) ABSTRACT

According to an example of the present disclosure, a learning tableware set includes a bowl and a spoon used in cooperation with the bowl. The bowl includes a bowl bottom and a curved bowl wall. The bowl bottom includes a peripheral recessed portion on one side of the bowl bottom. One side of the curved bowl wall is annularly connected to an edge of the side of the bowl bottom, and the other side of the curved bowl wall, which is not connected to the bowl bottom, includes a protruding edge extending toward a central axis of the bowl bottom. The spoon includes a holding portion and a scooping portion connected to the holding portion, and a curve of one end of the scooping portion away from the holding portion matches a curve of the peripheral recessed portion.

7 Claims, 13 Drawing Sheets

(56) References Cited

U.S. PATENT DOCUMENTS

2016/0376065 A1\* 12/2016 Zimmerman .......... A47G 19/10
220/574

\* cited by examiner

LEARNING TABLEWARE SET

RELATED APPLICATIONS

This application claims priority to Taiwan Application Serial Number 109207445, filed Jun. 12, 2020, which is herein incorporated by reference.

BACKGROUND

Technical Field

The present disclosure relates to a tableware set. More particularly, the present disclosure relates to a learning tableware set for toddler to use.

Description of Related Art

Toddlers start practicing eating with tableware when they are about 1-year-old. Therefore, special tableware for toddlers, which helps toddlers learn to use normal tableware as soon as possible, has been launched onto the market. The conventional toddler tableware has similar shape to the tableware for adults, and is made of materials resistant to breakage and heat, such as silicone or plastic. Thus, the safety of toddlers using the toddler tableware is enhanced.

In the beginning of practicing eating with tableware, toddlers often use a toddler spoon and a toddler bowl to learn how to scoop the food. Toddlers use only one side of the toddler spoon to scoop the food, so the food tends to fall or be spilt out therefrom. Moreover, because the bottom of the toddler bowl is flat, it is difficult for toddlers to scoop the left liquid food therein, which may lead to repeatedly scooping and food waste.

In this regard, it is still an unsolved problem to enhance the convenience of toddlers scooping liquid food with the toddler tableware, and prevent the food from being accidentally spilt out.

SUMMARY

According to an example of the present disclosure, a learning tableware set includes a bowl and a spoon used in cooperation with the bowl. The bowl includes a bowl bottom and a curved bowl wall. The bowl bottom includes a peripheral recessed portion on one side of the bowl bottom. One side of the curved bowl wall is annularly connected to an edge of the side of the bowl bottom, and the other side of the curved bowl wall, which is not connected to the bowl bottom, includes a protruding edge extending toward a central axis of the bowl bottom. The spoon includes a holding portion and a scooping portion connected to the holding portion, and a curve of one end of the scooping portion away from the holding portion matches a curve of the peripheral recessed portion.

According to another example of the present disclosure, a learning tableware set includes a bowl and a spoon used in cooperation with the bowl. The bowl includes a bowl bottom and a curved bowl wall. The bowl bottom includes a peripheral recessed portion on one side of the bowl bottom. One side of the curved bowl wall is annularly connected to an edge of the side of the bowl bottom, and the other side of the curved bowl wall, which is not connected to the bowl bottom, includes a protruding edge extending toward a central axis of the bowl bottom. The spoon includes a holding portion and a scooping portion connected to the holding portion, and a curve of one end of the scooping portion away from the holding portion matches a curve of the peripheral recessed portion. Two sides of the bowl opposite to each other are higher than the other two sides of the bowl opposite to each other, and a height of the bowl is in high and low along a peripheral direction of the bowl.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
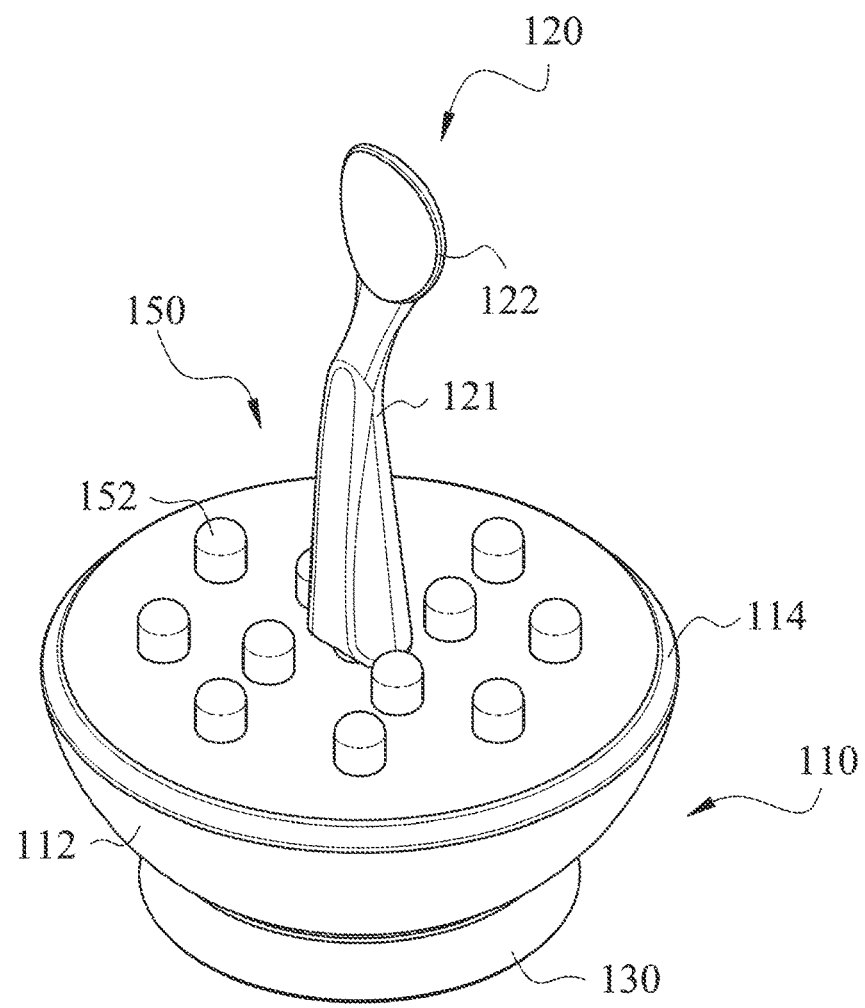
FIG. 1 is a three-dimensional schematic view of a learning tableware set according to an example of the present disclosure.
Figure 2:
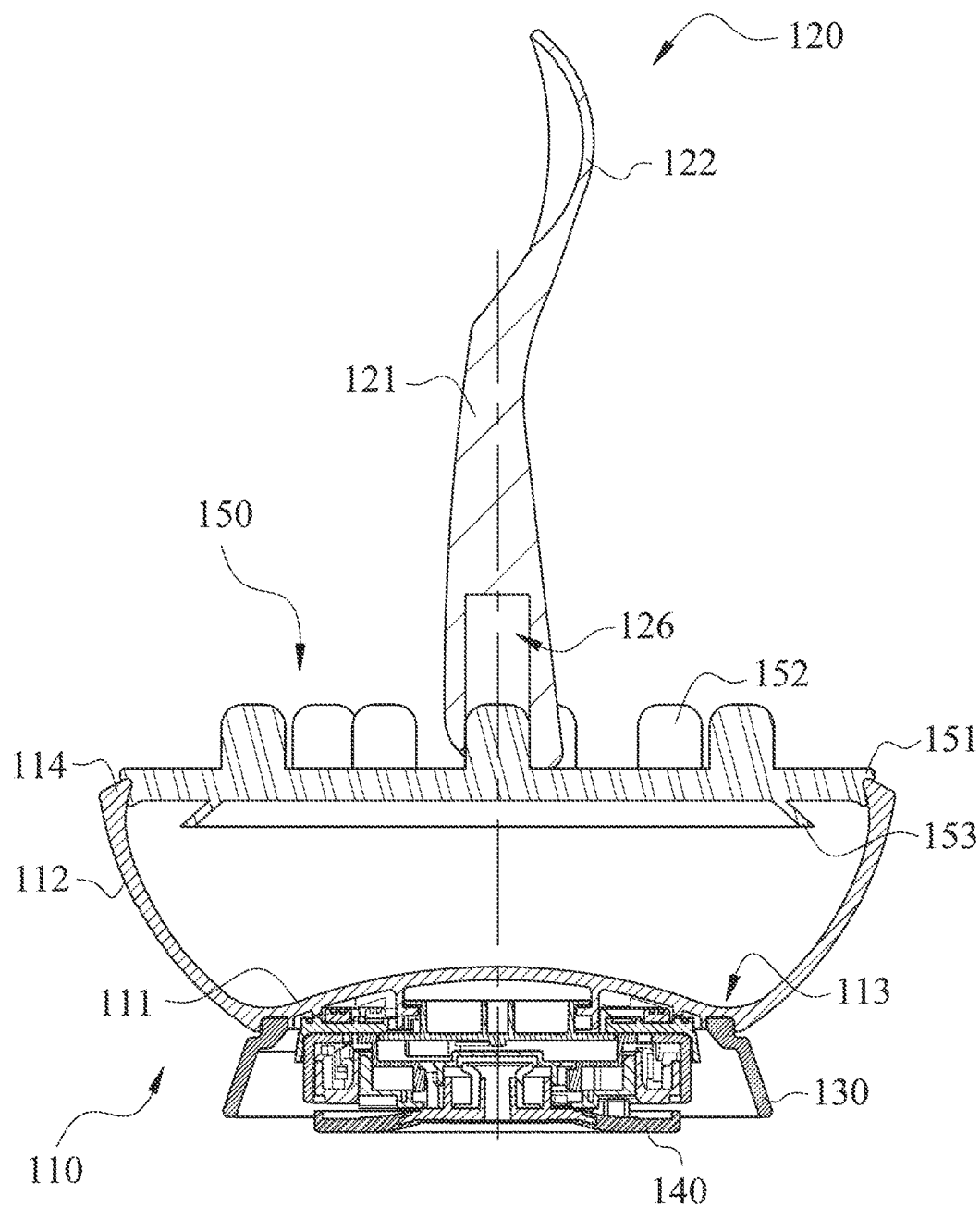
FIG. 2 is a cross-sectional schematic view of the learning tableware set of FIG. 1.
Figure 3:
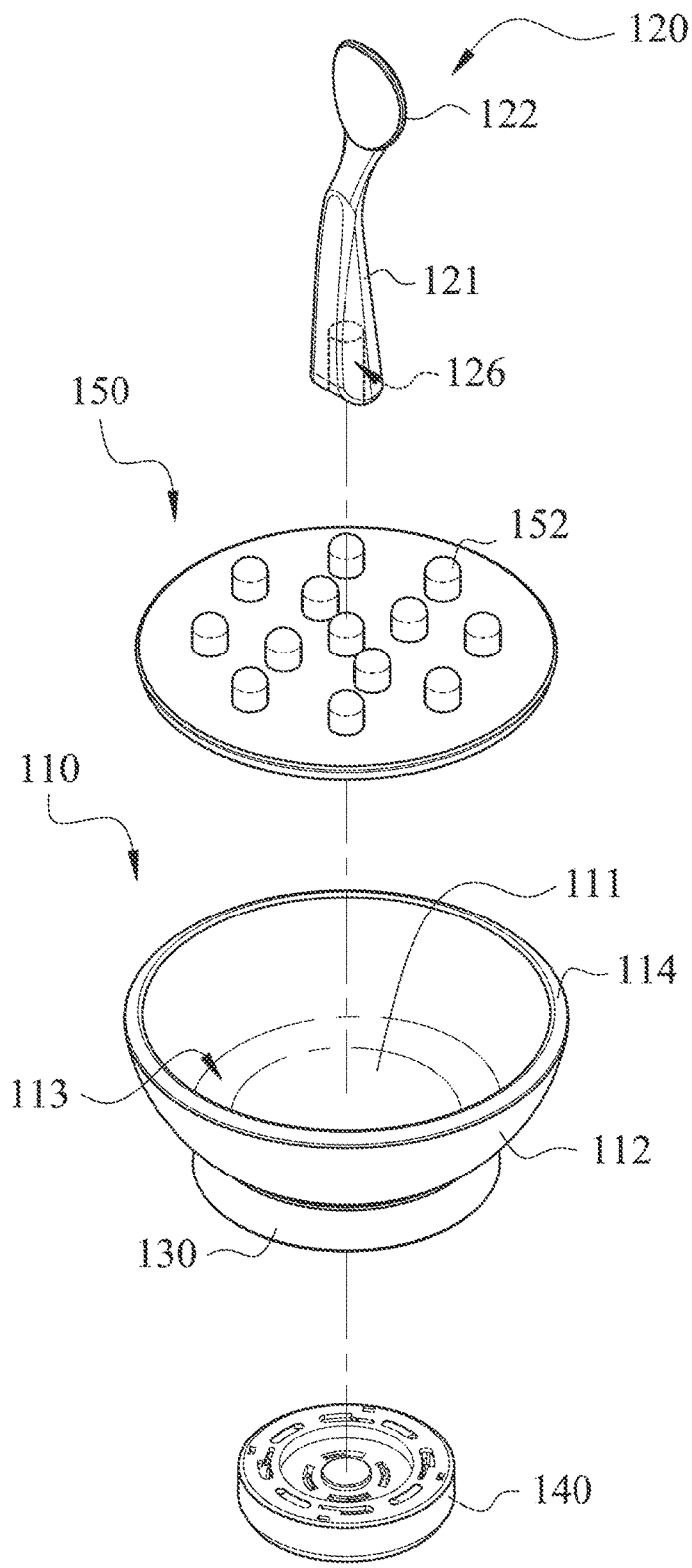
FIG. 3 is an explosive schematic view of the learning tableware set of FIG. 1.

Please refer to FIG. 1 to FIG. 3. FIG. 1 is a three-dimensional schematic view of a learning tableware set 100 according to an example of the present disclosure. FIG. 2 is a cross-sectional schematic view of the learning tableware set 100 of FIG. 1. FIG. 3 is an explosive schematic view of the learning tableware set 100 of FIG. 1. The learning tableware set 100 includes a bowl 110 and a spoon 120 used in cooperation with the bowl 110.

Figure 4:
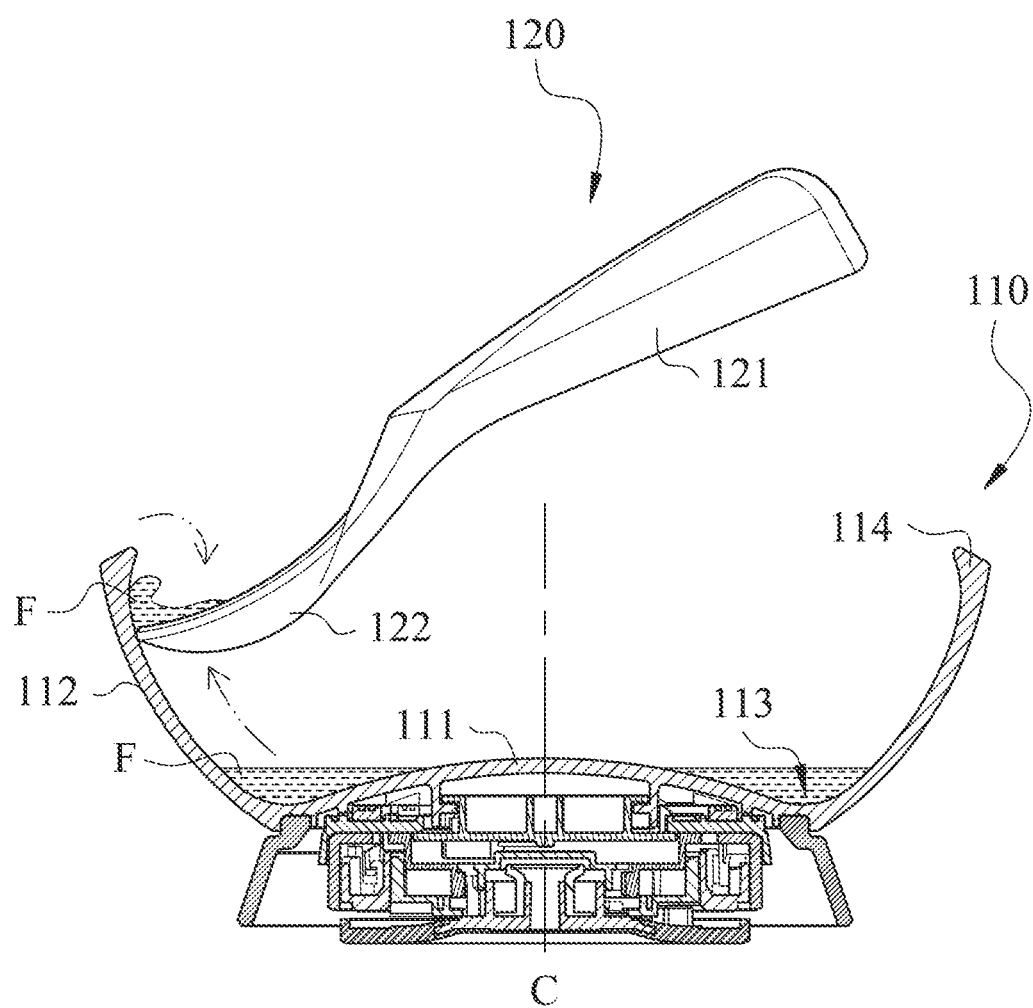
FIG. 4 is a schematic view of a peripheral recessed portion and a protruding edge of a bowl of the learning tableware set of FIG. 1 adapted for pushing the food together.

The bowl 110 includes a bowl bottom 111 and a curved bowl wall 112. The bowl bottom 111 includes a peripheral recessed portion 113 on one side of the bowl bottom 111, which makes a cross section of the bowl bottom 111 become a W-like shape as shown in FIG. 2. Please also refer to FIG. 4. FIG. 4 is a schematic view of the peripheral recessed portion 113 and a protruding edge 114 of the bowl 110 of the learning tableware set 100 of FIG. 1 adapted for pushing the food together. When a toddler has liquid food F with the learning tableware set 100, the left liquid food F stays in the peripheral recessed portion 113 for the toddler to scoop therefrom, reducing the scooping times.

One side of the curved bowl wall 112 is annularly connected to an edge of the side of the bowl bottom 111, and the other side of the curved bowl wall 112, which is not connected to the bowl bottom 111, includes the protruding edge 114 extending toward a central axis C of the bowl bottom 111. Please also refer to FIG. 4. The protruding edge 114 protrudes toward the central axis C of the bowl bottom 111. When the toddler scoops the food with the spoon 120, the food near one side of the spoon 120 can be pushed by the protruding edge 114 and moves toward the center part of the spoon 120. Thus, the toddler can scoop the food more firmly.

Figure 5:
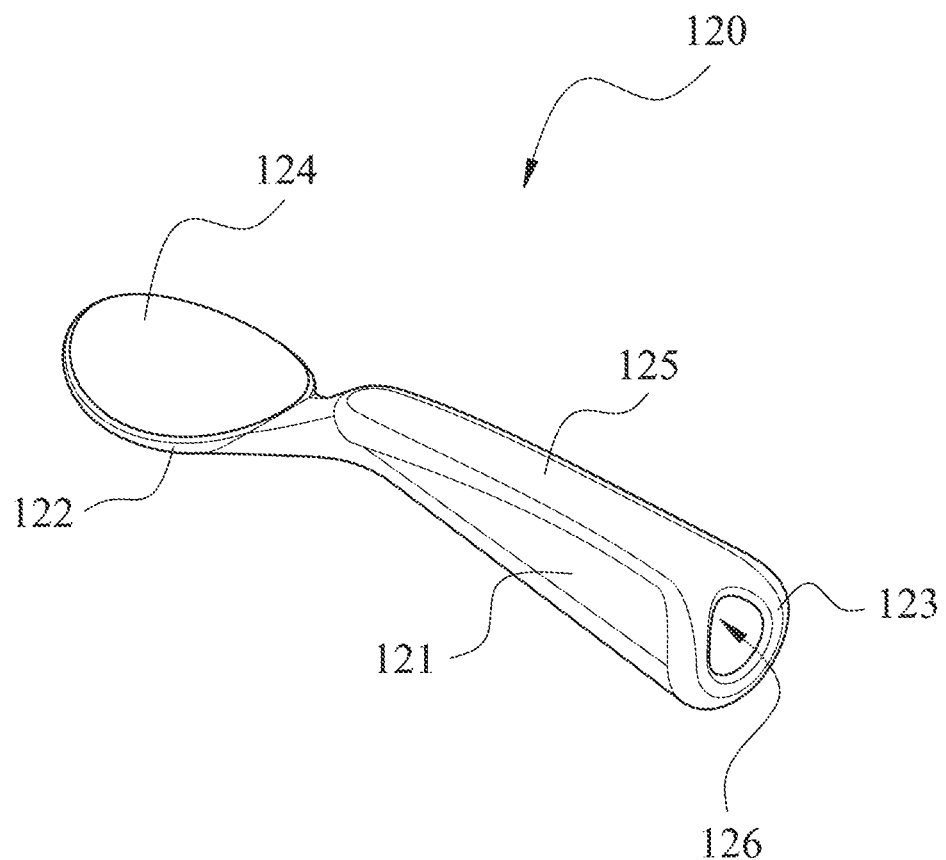
FIG. 5 is a three-dimensional schematic view of a spoon of the learning tableware set of FIG. 1.

Please refer to FIG. 5. FIG. 5 is a three-dimensional schematic view of the spoon 120 of the learning tableware set 100 of FIG. 1. The spoon 120 includes a holding portion 121 and a scooping portion 122 connected to the holding portion 121.

Figure 6A:
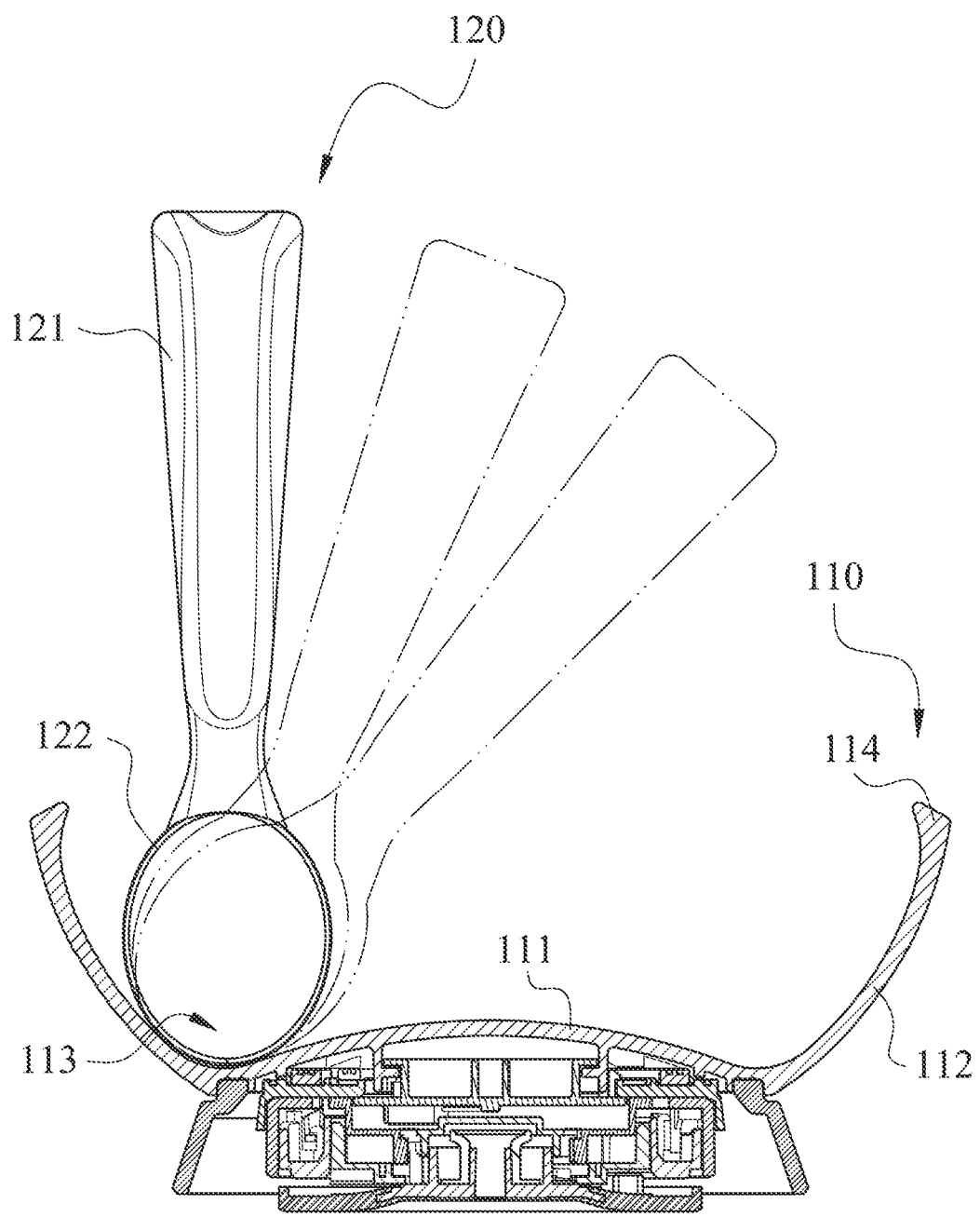
FIG. 6A is a schematic view of a curve of one end of the spoon matching a curve of the peripheral recessed portion of the bowl.
Figure 6B:
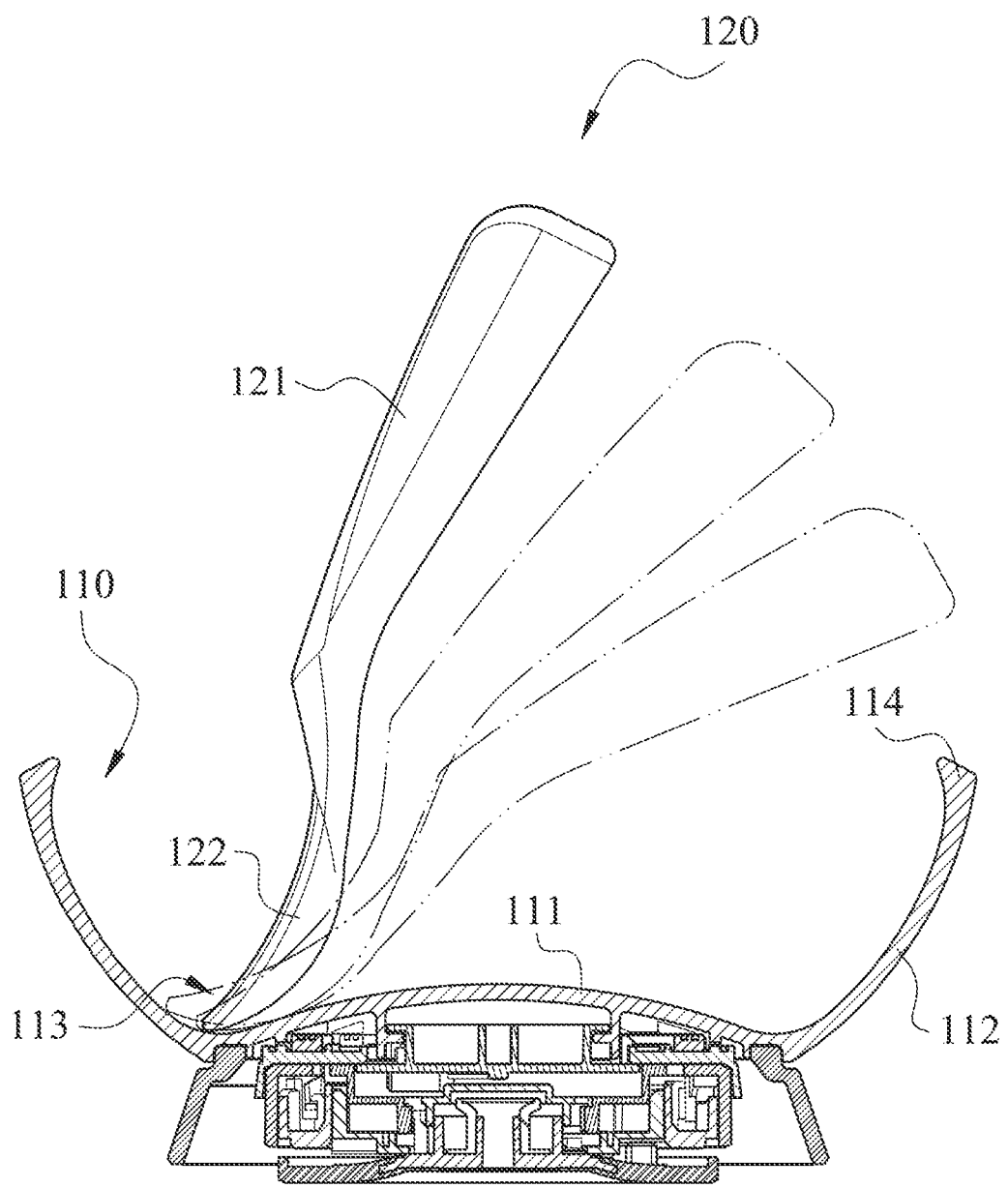
FIG. 6B is another schematic view of a curve of one end of the spoon matching a curve of the peripheral recessed portion of the bowl.

Please refer to FIG. 6A and FIG. 6B. FIG. 6A and FIG. 6B are different schematic views of a curve of one end of the spoon 120 matching a curve of the peripheral recessed portion 113 of the bowl 110. A curve of one end of the scooping portion 122 away from the holding portion 121 matches a curve of the peripheral recessed portion 113. Therefore, an end of the scooping portion 122 away from the holding portion 121 can fit the bowl bottom 111 when using the spoon 120 to scoop the liquid food F in the peripheral recessed portion 113, so more liquid food F can be scooped and the food left in the peripheral recessed portion 113 is reduced.

Please note that, from FIG. 6A and FIG. 6B, the scooping portion 122 of the spoon 120 can fit the bowl bottom 111 no matter scooping along the peripheral recessed portion 113 or along the curved bowl wall 112 up to the protruding edge 114. The difficulty of the toddler scooping the liquid food F with the learning tableware set 100 is significantly reduced because the liquid food F in the peripheral recessed portion 113 can be scooped along any direction. The peripheral recessed portion 113, the curved bowl wall 112 and the protruding edge 114 jointly form a smooth curved surface, which is in cooperation with the curve of the scooping portion 122 of the spoon 120. The toddler can scoop the food through a continuous movement, that is, through continuously moving the spoon 120 from the bowl bottom 111 along the curved bowl wall 112 to the protruding edge 114. Thus, it enhances the fluency of scooping and helps the toddler learn to use the tableware.

Figure 7A:
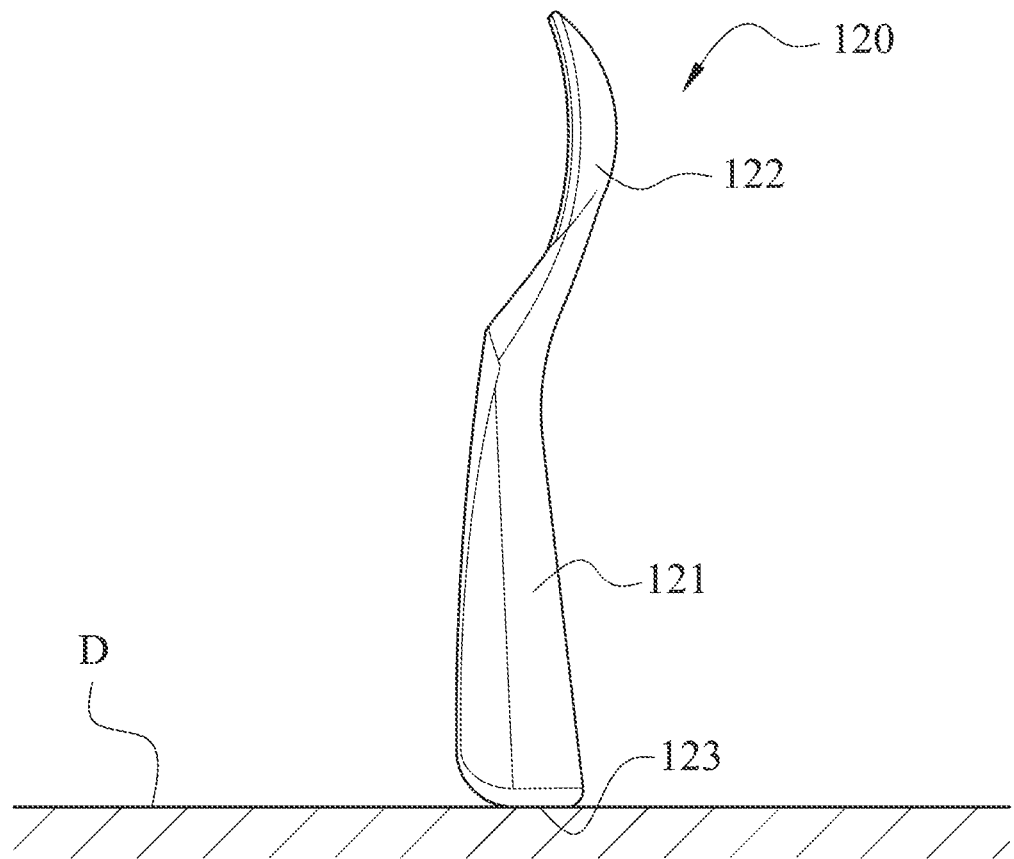
FIG. 7A is a schematic view of placing the spoon on the tabletop with a supporting surface of a short side of the spoon contacting thereto.

Please refer to FIG. 7A. FIG. 7A is a schematic view of placing the spoon 120 on the tabletop D with a supporting surface 123 of a short side of the spoon 120 contacting thereto. The holding portion 121 of the spoon 120 includes a short side away from the scooping portion 122, the short side includes a supporting surface 123, and a center of gravity of the spoon 120 is on a normal line of the supporting surface 123. The spoon 120 can be placed on the tabletop D with the supporting surface 123 contacting thereto. Thus, the spoon 120 is standing for the toddler to easily grab.

Figure 7B:
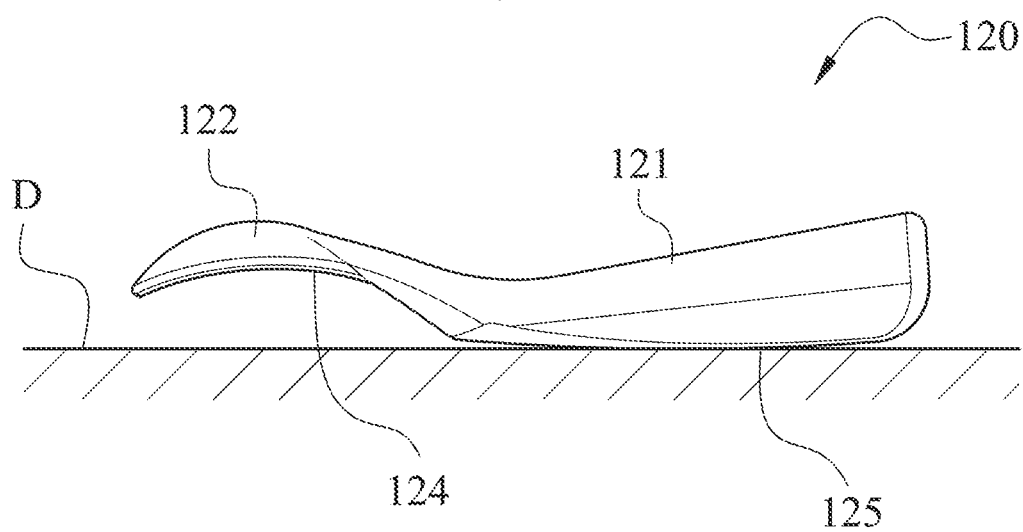
FIG. 7B is a schematic view of placing the spoon on the tabletop with a supporting surface of a long side of the spoon contacting thereto.

Please refer to FIG. 7B. FIG. 7B is a schematic view of placing the spoon 120 on the tabletop D with a supporting surface 125 of a long side of the spoon 120 contacting thereto. The scooping portion 122 of the spoon 120 includes a scooping surface 124, and the holding portion 121 of the spoon 120 includes a long side connected to the scooping surface 124. The long side includes a supporting surface 125, a center of gravity of the spoon 120 is on a normal line of the supporting surface 125, and an extension surface of the supporting surface 125 is separated from the scooping surface 124. The spoon 120 can be placed on the tabletop D with the supporting surface 125 contacting thereto, and the scooping surface 124 of the spoon 120 does not touch the tabletop D, so as to keep the scooping surface 124 clean.

Please note that the abovementioned normal lines represent the direction of gravity applied on the spoon 120. If the normal line is too far away from a centroid of the supporting surface 123 or the supporting surface 125, the gravity generates torque on the spoon 120 if the spoon 120 slightly shakes, and the spoon 120 will fall. Therefore, the abovementioned normal line can pass through the centroid of the supporting surface 123 or the supporting surface 125 to enhance the stability of placing the spoon 120.

Figure 8A:
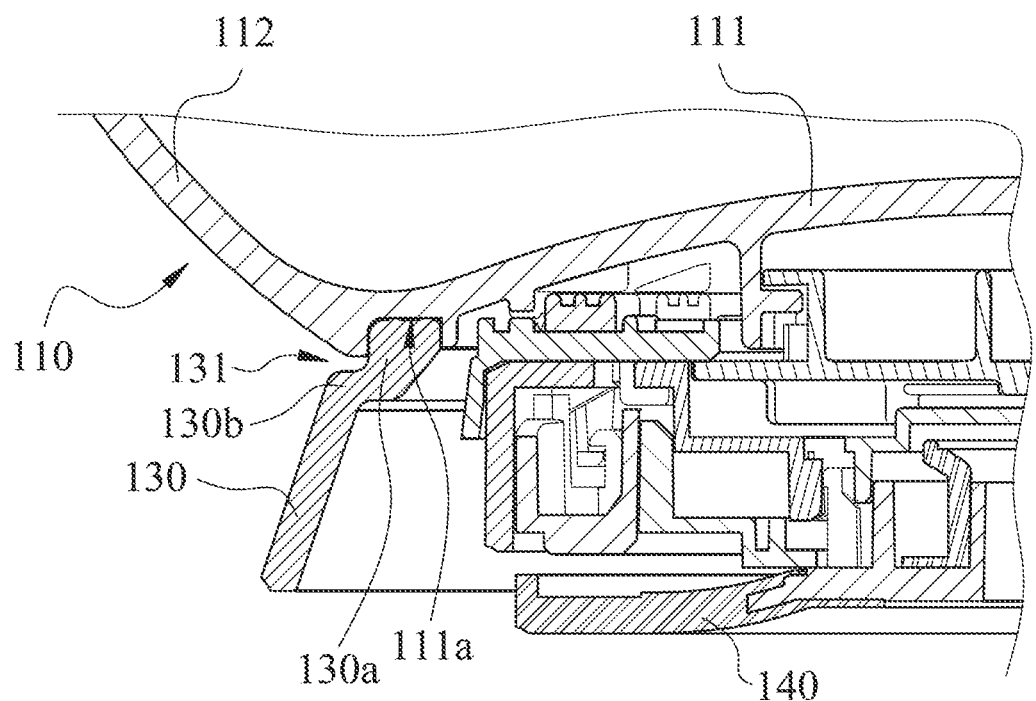
FIG. 8A is a partial cross-sectional schematic view of a support of the learning tableware set of FIG. 1.
Figure 8B:
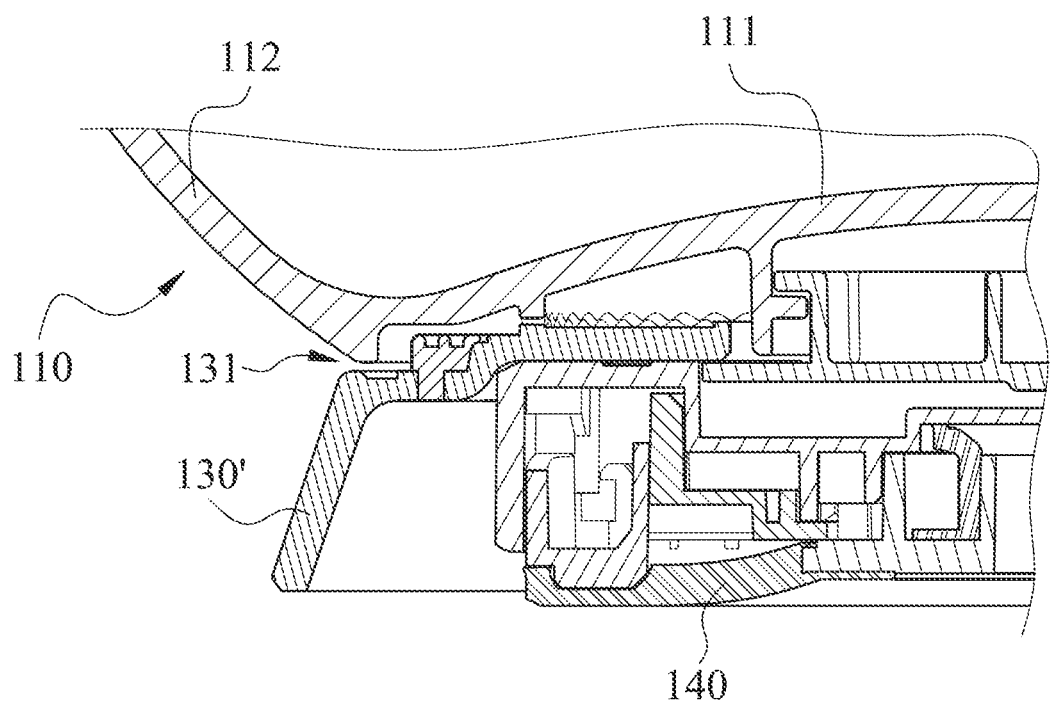
FIG. 8B is a partial cross-sectional schematic view of another support of the learning tableware set of FIG. 1.

Please refer to FIG. 1, FIG. 2, FIG. 3, FIG. 8A and FIG. 8B. FIG. 8A and FIG. 8B are partial cross-sectional schematic views of a support 130 and a support 130', which have different structures, of the learning tableware set 100 of FIG. 1, respectively. The learning tableware set 100 further includes the support 130 or the support 130'. The support 130 or the support 130' is connected to the other side of the bowl bottom 111, which is not connected to the curved bowl wall 112. The support 130 and the support 130' are adapted for firmly supporting the bowl 110. Specifically, the structure of the support 130 and the bowl bottom 111 can be undetachable, which is shown in FIG. 8A, for convenient manufacturing. In detail, a groove 111a can be formed in the bowl bottom 111, and the support 130 can include a protrusion 130a which forms an uppermost portion of the support 130. The protrusion 130a of the support 130 is disposed in the groove 111a of the bowl bottom 111, so as to firmly assemble the support 130 with the bowl bottom 111. On the other hand, the support 130' can be detachably connected to the bowl bottom 111, which is shown in FIG. 8B, so the support 130' can be separated from the bowl bottom 111. The height of the bowl 110 can be adjusted through assembling or detaching the support 130' according to different height of the tabletop.

Please note that, a water stopping groove 131 is formed by the support 130 or the support 130' along with the bowl bottom 111. In detail, a top surface of the protrusion 130a extends along a horizontal direction, and the support 130 has a ledge 130b which extends along the horizontal direction. The ledge 130b can be spaced apart from the top surface of the protrusion 130a in a vertical direction perpendicular to the horizontal direction, and the ledge 130b can be unaligned with the top surface of the protrusion 130a in the horizontal direction. Thus, the water stopping groove 131 can be formed between the ledge 130b of the support 130 and the bowl bottom 111. If a liquid drop flows down along the outer side of the curved bowl wall 112, the liquid drop stops at the water stopping groove 131 due to the surface tension. The liquid drop will not fall onto the tabletop, which reduces the burden as cleaning.

The learning tableware set 100 can further include a securing member 140 connected to the other side of the bowl bottom 111, which is not connected to the curved bowl wall 112. The securing member 140 is adapted for securing the bowl 110 to the tabletop to prevent the toddler from knocking over the bowl 110 accidentally. For example, the securing member 140 can be a suction cup assembly or a magnetic base for tabletops of different materials, which is not a limitation to the present disclosure. The suction of the abovementioned suction cup assembly can be removed by a pressing and turning way, that is, the suction cup assembly can be detached from the tabletop by simultaneously pressing and turning the bowl 110. In this regard, the difficulty of removing the suction of the suction cup assembly is enhanced, and the toddler is unable to move the bowl 110 at will.

If the learning tableware set 100 includes the support 130 (or the support 130') and the securing member 140 at the same time, the support 130 (or the support 130') can be disposed around the securing member 140. Thus, the securing member 140 is located in the space jointly defined by the support 130 (or the support 130'), the bowl bottom 111 and the tabletop when the bowl 110 is secured to the tabletop. It is hard for toddlers to reach the securing member 140 and to release the securing member 140 by their own.

The securing member 140 can be pivotably connected to the bowl bottom 111. When the bowl 110 is secured to the tabletop, the bowl 110 can pivot in a direction parallel to the tabletop, so the parents can turn a side of the bowl 110 with more foods to a position where the toddler is easy to scoop. Moreover, the abovementioned support 130', which is detachable, can be connected to the securing member 140. The support 130' will not rotate together with the bowl 110 when the bowl 110 is pivoting, which prevents the friction between the support 130' and the tabletop and enhances smoothness of rotating the bowl 110.

Figure 9:
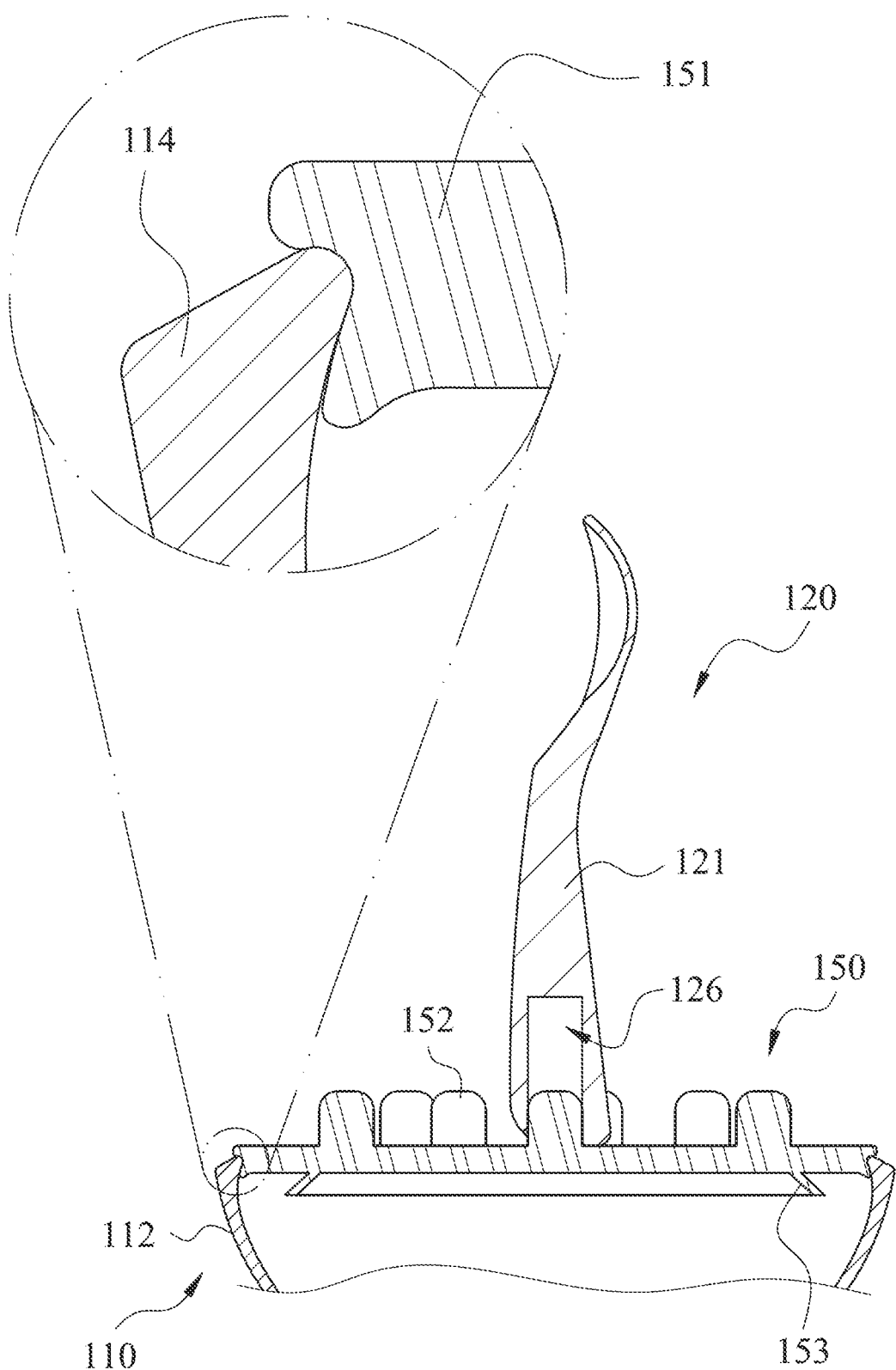
FIG. 9 is a cross-sectional schematic view of a bowl lid engaged with the bowl of the learning tableware set of FIG. 1.

Please refer to FIG. 1 to FIG. 3 and FIG. 9. FIG. 9 is a cross-sectional schematic view of a bowl lid 150 engaged with the bowl 110 of the learning tableware set 100 of FIG. 1. The learning tableware set 100 further includes the bowl lid 150. The bowl lid 150 includes a sealing portion 151 disposed around a peripheral edge of the bowl lid 150, and the sealing portion 151 is detachably engaged with the protruding edge 114 of the curved bowl wall 112. Thus, the bowl 110 is firmly closed by the bowl lid 150. The bowl lid 150 includes at least one protruding block 152 disposed on a side of the bowl lid 150, the holding portion 121 of the spoon 120 includes a hole 126, and the hole 126 is detachably coupled with the protruding block 152. The bowl lid 150 includes a securing portion 153 on the other side of the bowl lid 150, which does not include the protruding block 152, and the securing portion 153 is adapted for securing the bowl lid 150 to the tabletop. Therefore, the bowl lid 150 can be adapted to support the spoon 120 to prevent the spoon 120 from directly touching the tabletop, ensuring the sanitary conditions of the spoon 120 and the tabletop.

Figure 10:
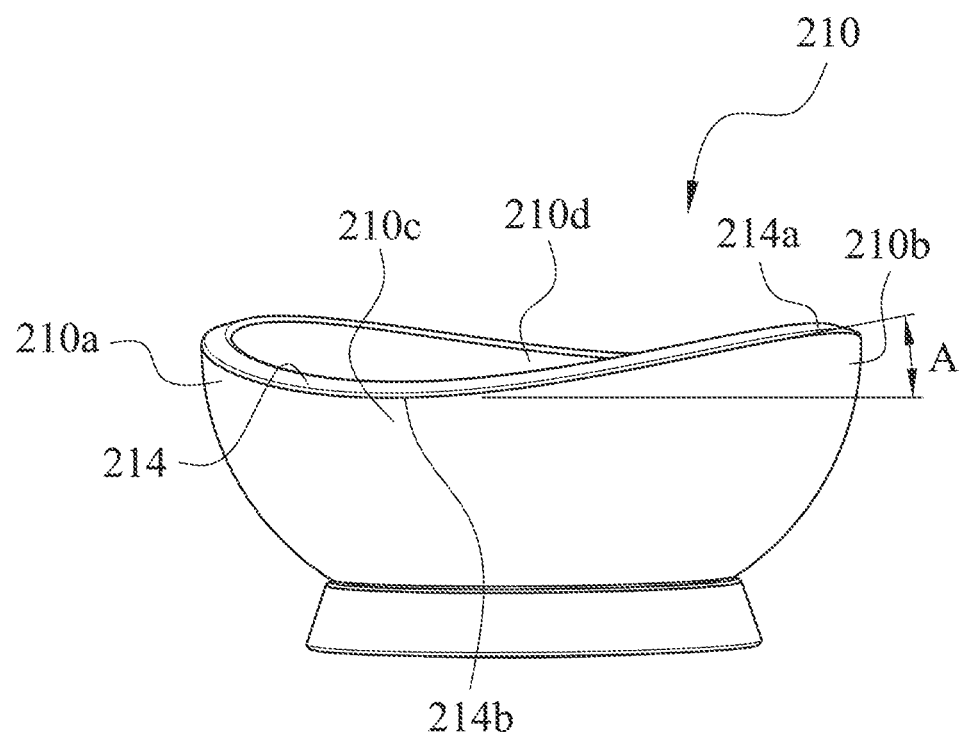
FIG. 10 is a three-dimensional schematic view of a bowl of a learning tableware set according to another example of the present disclosure.

Please refer to FIG. 10. FIG. 10 is a three-dimensional schematic view of a bowl 210 of a learning tableware set 200 according to another example of the present disclosure. The structure of the learning tableware set 200 is similar to the learning tableware set 100 according to the aforementioned example. The learning tableware set 200 is characterized in that: two sides 210a, 210b of the bowl 210 opposite to each other are higher than the other two sides 210c, 210d of the bowl 210 opposite to each other, that is, a height of the bowl 210 is in high and low along a peripheral direction of the bowl 210. Specifically, a protruding edge 214 of the bowl 210 includes a highest point 214a and a lowest point 214b, wherein the highest point 214a is at the side 210a or the side 210b, and the lowest point 214b is at the side 210c or the side 210d. An imaginary line can be formed by connecting the highest point 214a and the lowest point 214b. An angle between the imaginary line and a horizontal line is A, and the following condition can be satisfied: A≥8 degrees. When observing from the side view, the protruding edge 214 of the bowl 210 is almost in a "∞" shape. The two sides 210a, 210b of the bowl 210, which are higher, can be in the front of the toddler, while the two sides 210c, 210d, which are lower, can be toward the toddler's both hands when the toddler is using the learning tableware set 200. The higher two sides 210a, 210b can reduce the happening of the food spilling on the toddler as scooping the food. The toddler can scoop the food from the lower two sides 210c, 210d, so as to reduce the rotation of the toddler's wrist and the burden thereon.

Figure 11:
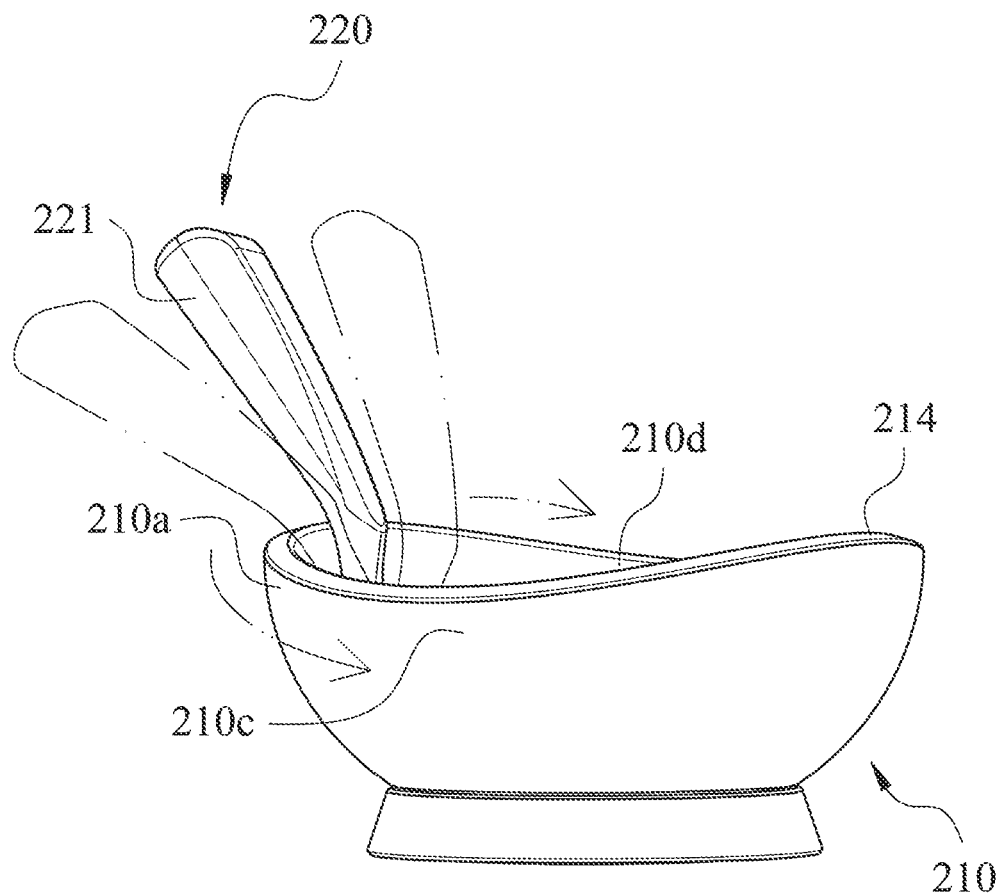
FIG. 11 is a three-dimensional schematic view of a spoon sliding along a protruding edge of the bowl of the learning tableware set of FIG. 10.

Furthermore, please refer to FIG. 11. FIG. 11 is a three-dimensional schematic view of a spoon 220 sliding along the protruding edge 214 of the bowl 210 of the learning tableware set 200 of FIG. 10. Besides the abovementioned advantages, when a holding portion 221 of the spoon 220 is put against the protruding edge 214, the spoon 220 will naturally slide down to the lower two sides 210c, 210d due to the height difference of the bowl 210. Hence, the holding portion 221 of the spoon 220 will be close to the toddler's hand, so the toddler can take the spoon 220 easily.

Figure 12:
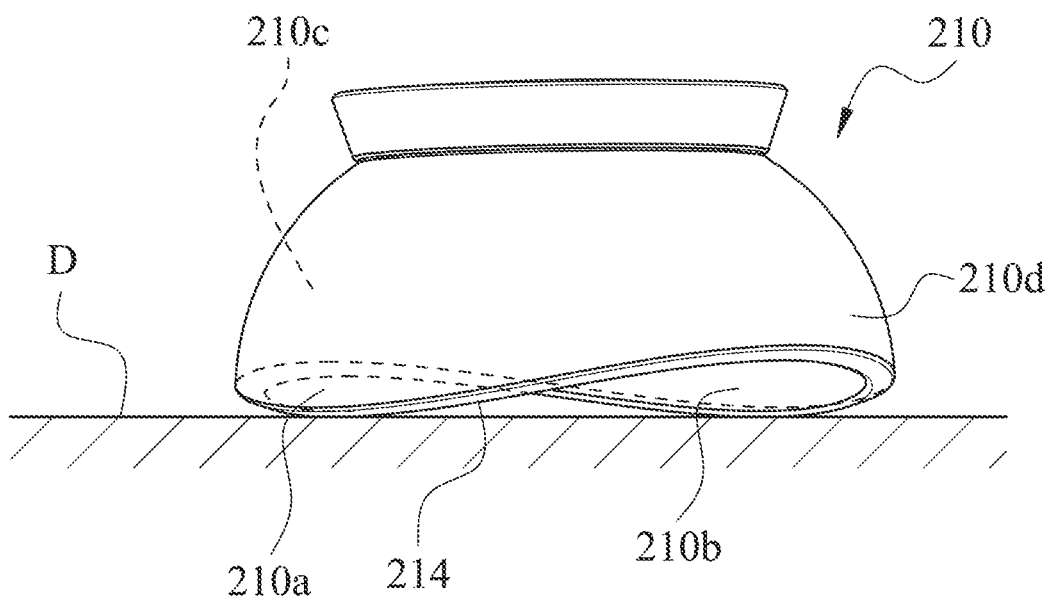
FIG. 12 is a three-dimensional schematic view of the bowl of FIG. 10 being placed upside-down on the tabletop.

Please refer to FIG. 12. FIG. 12 is a three-dimensional schematic view of the bowl 210 of FIG. 10 being placed upside-down on the tabletop D. It is shown if FIG. 12 that the protruding edge 214 on the lower two sides 210c, 210d do not touch the tabletop D when the bowl 210 is placed upside-down, because the two sides 210a, 210b of the bowl 210 are higher than the other two sides 210c, 210d of the bowl 210. After washing and overturning the bowl 210 on the tabletop D, air can flow in and out of the bowl 210 through the gaps between the lower two sides 210c, 210d and the tabletop D, helping the inside of the bowl 210 to dry. Also, it is easy to turn the bowl 210 back by flipping the bowl 210 over from the lower two sides 210c, 210d, which enhances the convenience as using the bowl 210.

In summary, when using the learning tableware set of the present disclosure, the liquid food can accumulate in the peripheral recessed portion of the bowl bottom, which facilitates the toddler scooping the liquid food. In scooping, the food can be pushed by the protruding edge of the curved bowl wall toward the center of the scooping portion. Thus, the toddler can scoop the food more firmly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A learning tableware set, comprising:
   a bowl, comprising:
      a bowl bottom comprising a peripheral recessed portion on one side of the bowl bottom, wherein a groove is formed in the bowl bottom; and
      a curved bowl wall, wherein one side of the curved bowl wall is annularly connected to an edge of the side of the bowl bottom, the other side of the curved bowl wall, which is not connected to the bowl bottom, comprises a protruding edge extending toward a central axis of the bowl bottom;
   a spoon used in cooperation with the bowl, comprising:
      a holding portion; and a scooping portion connected to the holding portion, wherein a radius of curvature of one end of the scooping portion away from the holding portion is equal to a radius of curvature of the peripheral recessed portion;

a bowl lid, comprising:
  a sealing portion disposed around a peripheral edge of the bowl lid, wherein the sealing portion is detachably engaged with the protruding edge of the curved bowl wall; and a support connected to the other side of the bowl bottom, which is not connected to the curved bowl wall, wherein the support is configured to firmly support the bowl, a water stopping groove is formed by the support and the bowl bottom, and the support comprises:
  a protrusion forming an uppermost portion of the support, wherein the protrusion of the support is disposed in the groove of the bowl bottom, a top surface of the protrusion extends along a horizontal direction; and
  a ledge extending along the horizontal direction, wherein the ledge is spaced apart from the top surface of the protrusion in a vertical direction perpendicular to the horizontal direction, and is unaligned with the top surface of the protrusion in the horizontal direction;
  wherein the water stopping groove is formed between the ledge of the support and the bowl bottom.

2. The learning tableware set of claim 1, further comprising a securing member connected to the other side of the bowl bottom, which is not connected to the curved bowl wall, wherein the securing member is configured to secure the bowl to a tabletop.

3. The learning tableware set of claim 2, wherein the securing member is pivotably connected to the bowl bottom, when the bowl is secured to the tabletop, the bowl pivots in a direction parallel to the tabletop.

4. The learning tableware set of claim 1, wherein the bowl lid comprises at least one protruding block disposed on a side of the bowl lid, the holding portion of the spoon comprises a hole, and the hole is detachably coupled with the at least one protruding block.

5. The learning tableware set of claim 4, wherein the bowl lid comprises a securing portion on the other side of the bowl lid, which does not comprise the at least one protruding block, and the securing portion is configured to secure the bowl lid to a tabletop.

6. The learning tableware set of claim 1, wherein the holding portion of the spoon comprises a short side away from the scooping portion, the short side comprises a supporting surface, a center of gravity of the spoon is on a normal line of the supporting surface, and the normal line passes through a centroid of the supporting surface.

7. The learning tableware set of claim 1, wherein the scooping portion of the spoon comprises a scooping surface, the holding portion of the spoon comprises a long side connected to the scooping surface, the long side comprises a supporting surface, a center of gravity of the spoon is on a normal line of the supporting surface, an extension surface of the supporting surface is separated from the scooping surface, and the normal line passes through a centroid of the supporting surface.

* * * * *